(12) United States Patent
Iwamoto et al.

(10) Patent No.: US 6,627,871 B2
(45) Date of Patent: Sep. 30, 2003

(54) OPTICAL POSITION DETECTING DEVICE HAVING MOUNTING MEMBER FOR RETROREFLECTOR AND OPTICAL TRANSCEIVER

(75) Inventors: Yasuhide Iwamoto, Kawasaki (JP); Satoshi Sano, Kawasaki (JP); Fumihiko Nakazawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 16 days.

(21) Appl. No.: 10/177,167

(22) Filed: Jun. 21, 2002

(65) Prior Publication Data

US 2002/0162949 A1 Nov. 7, 2002

Related U.S. Application Data

(63) Continuation of application No. PCT/JP00/00581, filed on Feb. 2, 2000.

(51) Int. Cl.[7] .............................. G06M 7/00; H01J 40/14
(52) U.S. Cl. ........................ 250/221; 356/621; 340/556
(58) Field of Search ........................ 250/221, 222.1; 356/615, 621, 623; 340/550–561; 178/18.01, 18.02; 345/173, 178

(56) References Cited

U.S. PATENT DOCUMENTS

| | | | | |
|---|---|---|---|---|
| 4,239,961 A | * | 12/1980 | Lasar | 250/221 |
| 4,507,557 A | * | 3/1985 | Tsikos | 250/341.7 |
| 4,710,760 A | * | 12/1987 | Kasday | 345/175 |
| 4,762,990 A | * | 8/1988 | Caswell et al. | 250/221 |
| 4,811,004 A | * | 3/1989 | Person et al. | 345/175 |
| 4,980,547 A | * | 12/1990 | Griffin | 250/221 |
| 5,148,016 A | * | 9/1992 | Murakami et al. | 250/221 |
| 5,789,739 A | * | 8/1998 | Schwarz | 250/221 |
| 6,268,868 B1 | * | 7/2001 | Yamaguchi et al. | 345/619 |
| 6,362,468 B1 | * | 3/2002 | Murakami et al. | 250/221 |
| 2001/0002694 A1 | * | 6/2001 | Nakazawa et al. | 250/221 |

FOREIGN PATENT DOCUMENTS

| | | |
|---|---|---|
| JP | 57-211637 | 12/1982 |
| JP | 59-182754 | 12/1984 |
| JP | 62-5428 | 1/1987 |
| JP | 62-32491 | 7/1987 |
| JP | 3-292523 | 12/1991 |
| JP | 4-101139 | 9/1992 |
| JP | 10-282898 | 10/1998 |
| JP | 11-85399 | 3/1999 |
| WO | 92/02008 | 2/1992 |

* cited by examiner

Primary Examiner—Stephone B. Allen
Assistant Examiner—Eric J Spears
(74) Attorney, Agent, or Firm—Greer, Burns & Crain, Ltd.

(57) ABSTRACT

An optical position detecting device includes side frames on three sides, which are composed of slide parts and guide parts for guiding the slide parts and provided with light retro-reflectors; and a side frame on one side, which is composed of a slide part and a guide part for guiding the slide part and incorporates two optical units including light emitting elements, polygon mirrors and light receiving elements, and the optical position detecting device is externally fixed to a display apparatus by moving the slide parts.

5 Claims, 16 Drawing Sheets

BEFORE EXTERNALLY
FIXING

AFTER EXTERNALLY
FIXING

FIG. 6 (a) BEFORE EXTERNALLY FIXING
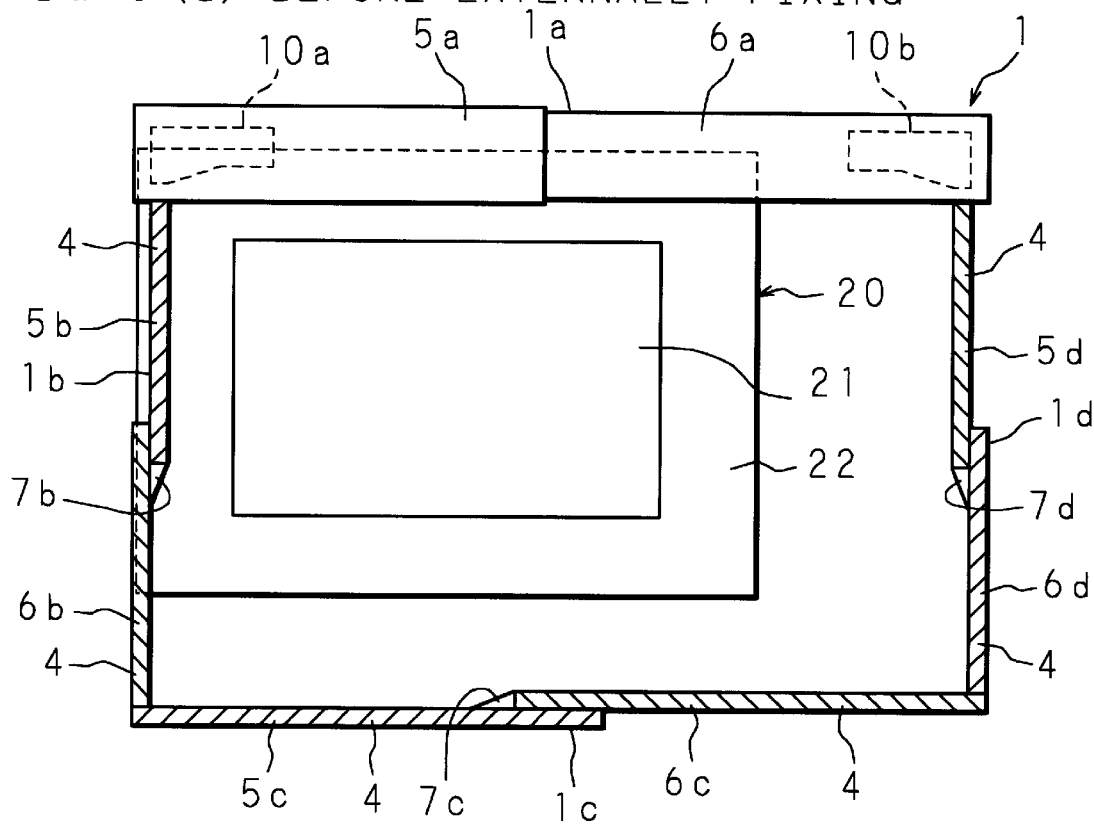
FIG. 6 (b) AFTER EXTERNALLY FIXING
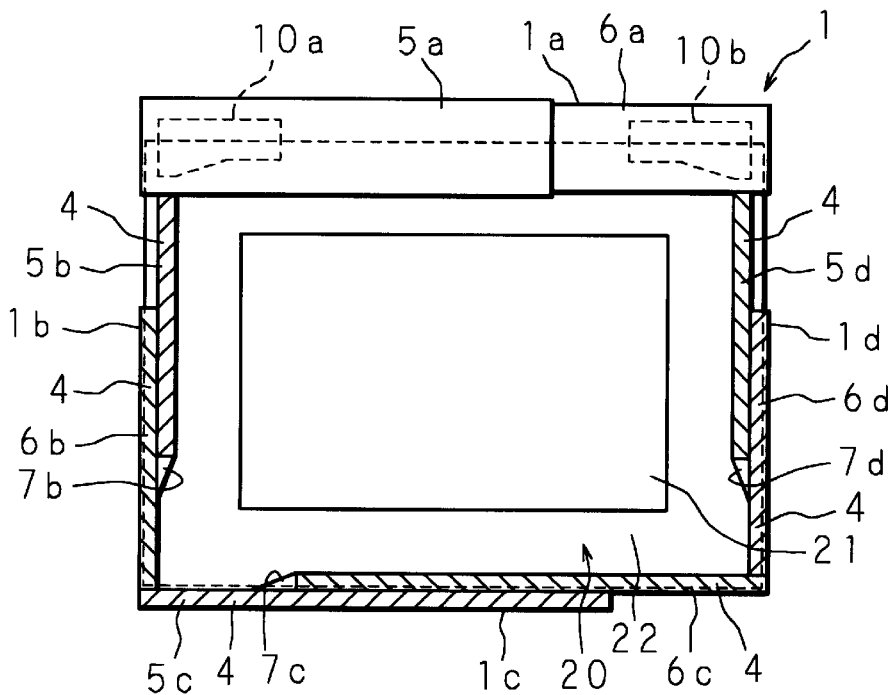

BEFORE EXTERNALLY
FIXING

AFTER EXTERNALLY
FIXING

BEFORE EXTERNALLY
FIXING

AFTER EXTERNALLY
FIXING $$\begin{pmatrix} Px(\theta, \phi) \\ Py(\theta, \phi) \end{pmatrix} = \begin{pmatrix} \dfrac{\tan\phi}{\tan\theta + \tan\phi} L \\ \dfrac{\tan\theta \tan\phi}{\tan\theta + \tan\phi} L \end{pmatrix}$$

$$\begin{cases} Pcx\ (\theta,\ \phi) = Pcx\ (\theta 1 + \frac{1}{2}d\theta,\ \phi 1 + \frac{1}{2}d\phi) \\ Pcy\ (\theta,\ \phi) = Pcy\ (\theta 1 + \frac{1}{2}d\theta,\ \phi 1 + \frac{1}{2}d\phi) \end{cases}$$

D1, D2 : DIAMETER OF CROSS SECTION OF INDICATOR $$\begin{cases} OPc = r1 = \sqrt{Pcx^2 + Pcy^2} \\ BPc = r2 = \sqrt{(L-Pcx)^2 + Pcy^2} \end{cases}$$

$$\begin{cases} D1 = 2 \cdot r1 \cdot \sin\frac{1}{2}d\theta = 2\sqrt{Pcx^2 + Pcy^2} \cdot \sin\frac{1}{2}d\theta \\ D2 = 2 \cdot r2 \cdot \sin\frac{1}{2}d\phi = 2\sqrt{(L-Pcx)^2 + Pcy^2} \cdot \sin\frac{1}{2}d\phi \end{cases}$$

OPTICAL POSITION DETECTING DEVICE HAVING MOUNTING MEMBER FOR RETROREFLECTOR AND OPTICAL TRANSCEIVER

This application is a continuation of international application PCT/JP00/00581, filed on Feb. 2, 2000.

TECHNICAL FIELD

The present invention relates to an optical position detecting device for optically detecting a position indicated by an indicator within a predetermined region on a computer's display screen or the like.

BACKGROUND ART

With the spread of computer systems, mainly personal computers, there has been used a device for inputting new information or giving various instructions to a computer system by pointing at a position on a display screen of a display apparatus on which information is displayed by the computer system, by an indicator such as a person's finger or a specific tool. In order to perform an input operation with respect to the information displayed on the display screen of the display apparatus of a personal computer or the like by a touching method, it is necessary to detect a touched position (indicated position) on the display screen with high accuracy.

As one example of a device for detecting such an indicated position on the display screen that functions as a coordinate surface, Japanese Patent Application Publication No. 62-32491/1987 discloses an optical position detecting device. This device comprises: an indicating member for pointing at a display screen; at least two optical scanners for emitting scanning light on the display screen; a reflecting member for reflecting the scanning light; and means for detecting a time at which the scanning light struck the indicating member, and detects the position of the indicating member on the display screen, based on the relation between the optical scanning start time or end time of the optical scanners and the time at which the scanning light struck the indicating member.

Besides, another optical position detecting device is disclosed in Japanese Patent Application Laid-Open No. 57-211637/1982. This device angularly scans converged light such as a laser beam from the outside of the display screen, calculates angles at which a special pen having reflecting means exists from two timings of reflected light from the special pen respectively, and detects the coordinates of the position from the calculated angles using the triangulation principle.

Further, still another optical position detecting device is proposed in Japanese Patent Application Laid-Open No. 62-5428/1987. In this device, a light retro-reflector is positioned on a frame on both sides of the display screen, return light of an angularly scanned laser beam from the light retro-reflector is detected, an angle of a position where a finger or a pen exists is calculated from a timing that the light beam is cut off by the finger or the pen, and the coordinates of the position is detected from the calculated angle using the triangulation principle.

None of the conventional optical position detecting devices as described above has a mounting structure because these devices are incorporated by reforming the front part of the body of an existing display apparatus, and thus there is a problem that they are not easily handled. In addition, since the conventional optical position detecting devices have a configuration which is adoptable only to a display screen of a predetermined size, there is such a time-consuming problem that it is necessary to fabricate a special optical position detecting device according to each of various sizes of display screens.

The present invention has been achieved in view of such circumstances, and an object of the present invention is to provide an optical position detecting device that can be easily mounted on an existing display apparatus.

Another object of the present invention is to provide an optical position detecting device that is adoptable to various sizes of display screens, eliminates the necessity of fabricating a special detecting device according to each size of display screen, and yields good productivity.

DISCLOSURE OF THE INVENTION

An optical position detecting device of the first aspect comprises: a light retro-reflector; at least two optical transceiver units, each including an optical scanning unit for angularly scanning light in a plane and a light receiving unit for receiving reflected light of the scanning light from the light retro-reflector; and an external mounting member for mounting the light retro-reflector and the optical transceiver units on an apparatus including a predetermined region to be detected (for example, a display apparatus including a display screen).

Since the optical position detecting device of the first aspect is externally mountable on a display apparatus or the like by the external mounting member, it can be easily mounted on an existing display apparatus.

An optical position detecting device of the second aspect is based on the first aspect, wherein the external mounting member includes a changing mechanism that can adjust the positions of the light retro-reflector and the optical transceiver units.

The optical position detecting device of the second aspect can change the positions of the light retro-reflector and the optical transceiver units according to the size of a display screen, for example, and can correspond to various sizes of display screens.

An optical position detecting device of the third aspect is based on the second aspect, wherein the changing mechanism comprises a slide part that moves in one direction and a guide part that guides the movement of the slide part.

The optical position detecting device of the third aspect can correspond to any size of display screen by moving/adjusting the slide part along the guide part.

An optical position detecting device of the fourth aspect is based on the third aspect, wherein an overlapped portion of the light retro-reflector is present at the joint between the slide part and the guide part.

In the optical position detecting device of the fourth aspect, since such an overlapped portion of the light retro-reflector is provided, the light retro-reflector does not form an uneven portion at the joint between the slide part and the guide part, and therefore detection characteristics do not deteriorate.

An optical position detecting device of the fifth aspect is based on the first through fourth aspects, wherein the external mounting member includes an elastic body on a face to be attached to the display apparatus or the like.

Even when the display screen has a tapered shape, the optical position detecting device of the fifth aspect exhibits high adhesion with the display screen, thereby certainly fixing the display screen.

An optical position detecting device of the sixth aspect comprises a light retro-reflector mounted on a portion with a difference in level on the periphery of the display screen.

In the optical position detecting device of the sixth aspect, a position changing mechanism with respect to the light retro-reflector is unnecessary, thereby reducing the size of the structure. Moreover, since the scanning light is not apart from the display screen, the operability is improved.

BRIEF DESCRIPTION OF THE DRAWINGS

FIGS. 6(a) and 6(b) are front views showing the process of externally mounting an optical position detecting device of the second embodiment of the present invention on the display apparatus;

BEST MODE FOR IMPLEMENTING THE INVENTION

The following description will describe the present invention in detail with reference to the drawings illustrating some embodiments thereof.

(First Embodiment)

Figure 1:
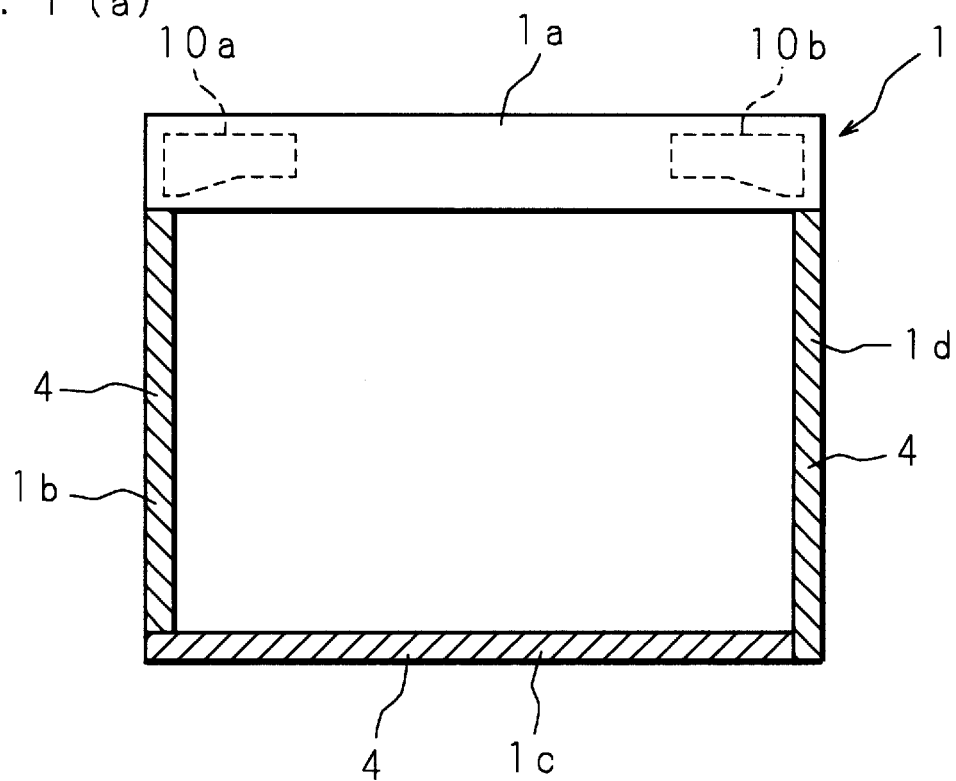
FIGS. 1(a) and 1(b) are front and side views of an optical position detecting device according to the first embodiment of the present invention.
Figure 1:
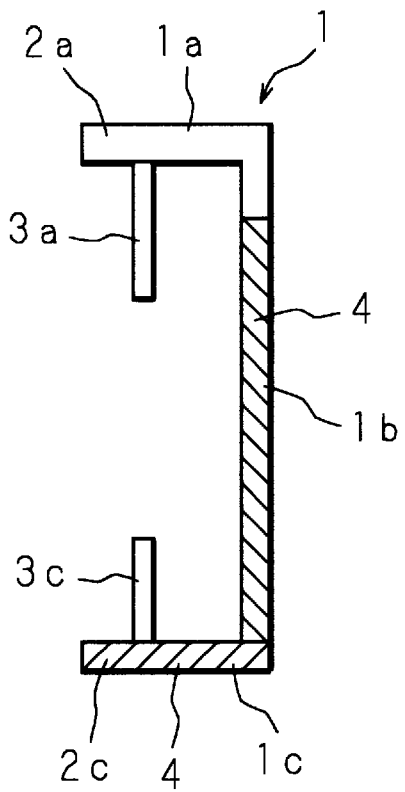

FIGS. 1(a) and 1(b) are front and side views of an optical position detecting device according to the first embodiment. This optical position detecting device is in the shape of a hollow rectangular parallelepiped body as a whole, and comprises four side frames 1a, 1b, 1c and 1d.

The upper side frame 1a in FIG. 1(a) has a larger width compared to other three side frames 1b, 1c and 1d, and incorporates optical units 10a and 10b having a later-described internal structure in its both ends.

Moreover, this side frame 1a and the opposite side frame 1c (on the lower side in FIG. 1(a)) have a higher height compared to the mutually facing side frames 1b and 1d (on the left side and the right side in FIG. 1(a)) and the higher portions serve as guide parts 2a and 2c with rails (not shown) extended in the height direction. Slide parts 3a and 3c are attached to the guide parts 2a and 2c so that the slide parts 3a and 3c are movable in the height direction along the rails of the guide parts 2a and 2c.

Further, these three side frames 1b, 1c and 1d are provided with a light retro-reflector 4.

Figure 2:
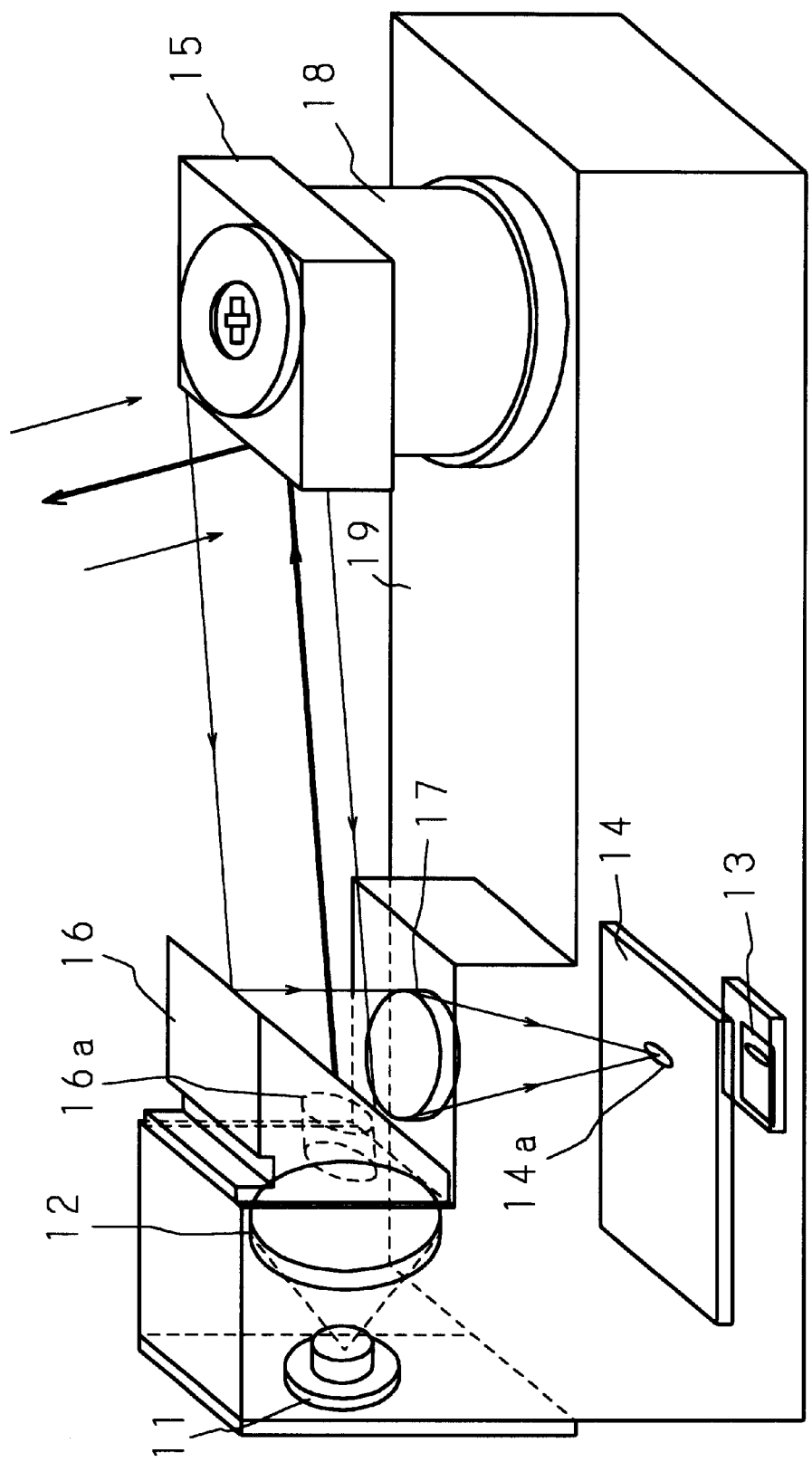
FIG. 2 is a view showing the structure of an optical unit and the optical path.

FIG. 2 is a view showing the structure of the optical units 10a, 10b and the optical path. Both of the optical units 10a and 10b have the same internal structure. The optical unit 10a (10b) includes a light emitting element 11 composed of a laser diode (LD) for emitting infrared laser light; a collimation lens 12 for making the laser light from the light emitting element 11 parallel light; a light receiving element 13 composed of a photodiode (PD) for receiving reflected light from the light retro-reflector 4; a light blocking member 14 having an aperture 14a for limiting the incident light on the light receiving element 13; a polygon mirror 15 having the shape of a square column, for example, for angularly scanning the laser light from the light emitting element 11; an aperture mirror 16 for limiting light to be projected onto the polygon mirror 15 from the collimation lens 12 by an aperture 16a and for reflecting light reflected from the light retro-reflector 4 through the polygon mirror 15 toward the light receiving element 13; a condenser lens 17 for focusing the reflected light from the aperture mirror 16; a motor 18 for rotating the polygon mirror 15, and an optical unit main body 19 on which these members are mounted and fixed.

The laser light emitted by the light emitting element 11 is made parallel light by the collimation lens 12, passes through the aperture 16a of the aperture mirror 16, and is then angularly scanned in a plane substantially orthogonal to the side frames 1a, 1b, 1c and 1d of the optical position detecting device 1 with the rotation of the polygon mirror 15 and projected onto the light retro-reflector 4 of the side frames 1b, 1c and 1d. After the reflected light from the light retro-reflector 4 is reflected by the polygon mirror 15 and aperture mirror 16, the reflected light is focused by the condenser lens 17, passes through the aperture 14a of the light blocking member 14 and enters the light receiving element 13. However, if an object is present on the path of the scanning light, the scanning light is cut off, and therefore the reflected light does not enter the light receiving element 13.

Figure 3:
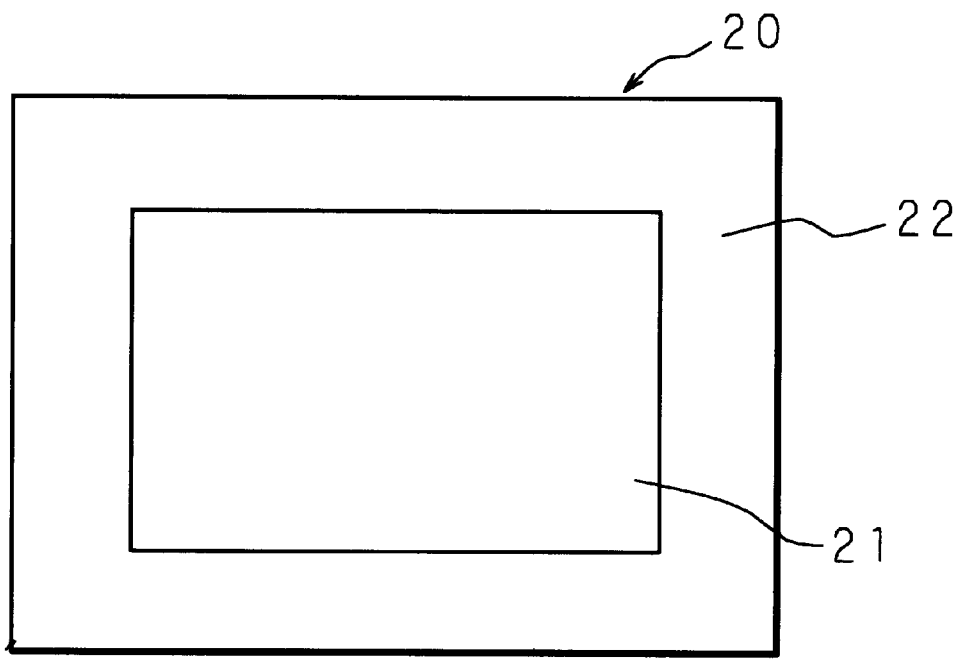
FIG. 3 is a front view of a display apparatus.
Figure 4:
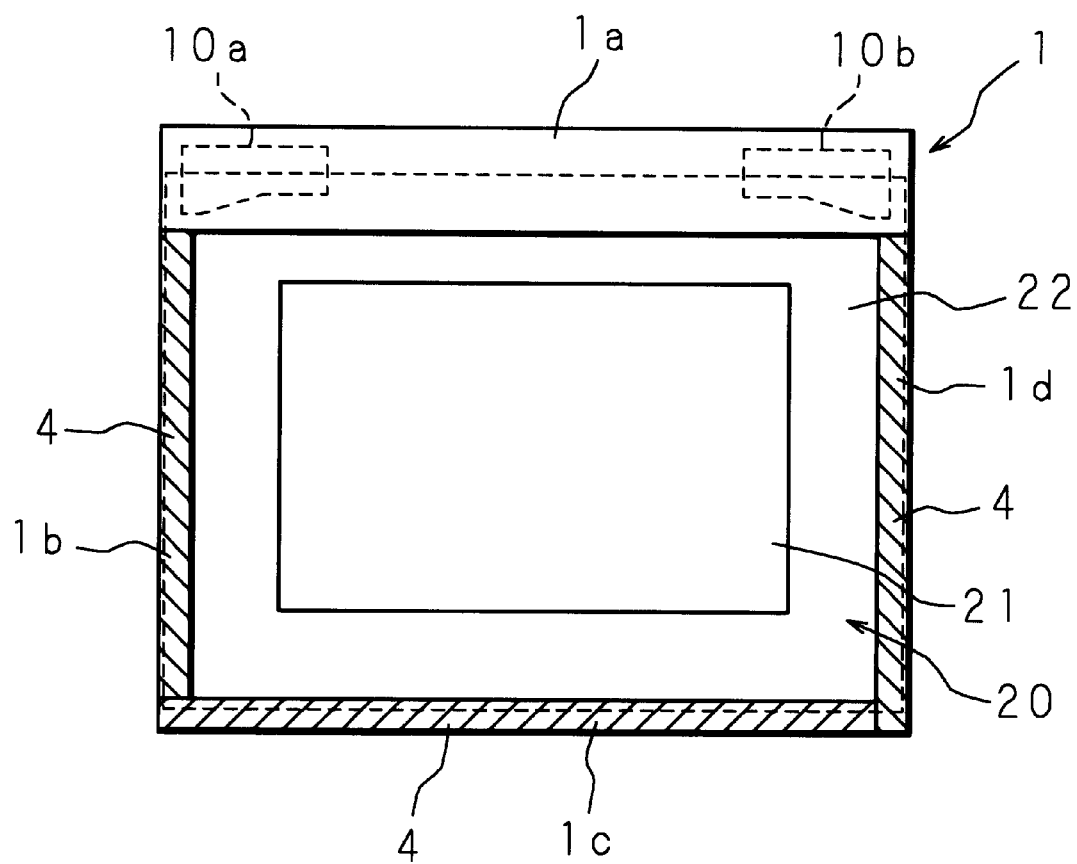
FIG. 4 is a front view showing a state where the optical position detecting device of the first embodiment is externally mounted on the display apparatus.

FIG. 3 is a front view of a display apparatus. As shown in FIG. 3, a display apparatus 20 having a flat rectangular parallelepiped shape comprises a display screen 21, and a screen frame 22 on which the display screen 21 is mounted. The optical position detecting device 1 having the structure as described above is externally mounted on such a display apparatus 20. FIG. 4 is a front view showing a state where the optical position detecting device 1 of the first embodiment is externally mounted on the display apparatus 20, and FIGS. 5(a) and 5(b) are side views showing the process of externally mounting the optical position detecting device 1 on the display apparatus 20.

In a state where the slide parts 3a and 3c are set in their rear most position, the side frames 1a, 1b, 1c and 1d of the optical position detecting device 1 are fitted with the external edges of the four sides of the screen frame 22 of the display apparatus 20 (FIG. 5(a)). Next, the slide parts 3a and 3c on the rear side are moved toward the front side until they touch the rear face of the display apparatus 20 so as to externally fix the optical position detecting device 1 to the display apparatus 20 (FIG. 5(b)).

As described above, in the first embodiment, the optical position detecting device 1 can be fixed in any position, and can correspond to a variety of display apparatuses 20 having different thicknesses.

(Second Embodiment)

Figure 7A:
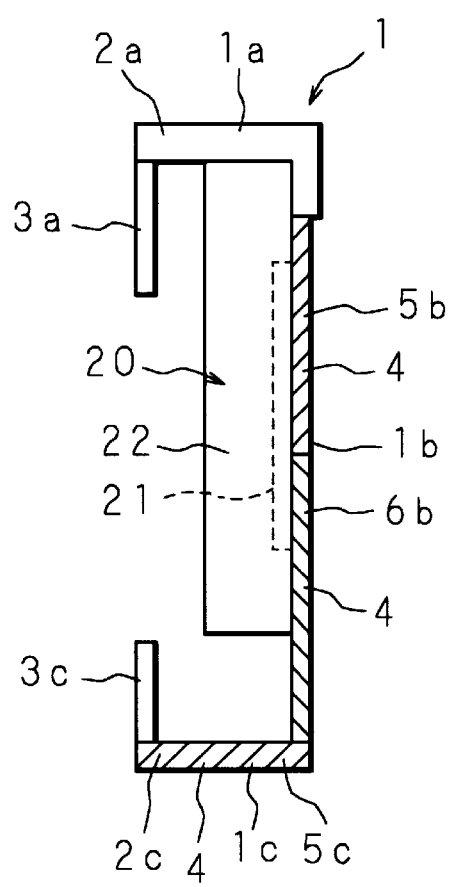
FIGS. 7(a) and 7(b) are side views showing the process of externally mounting the optical position detecting device of the second embodiment on the display apparatus.
Figure 7B:
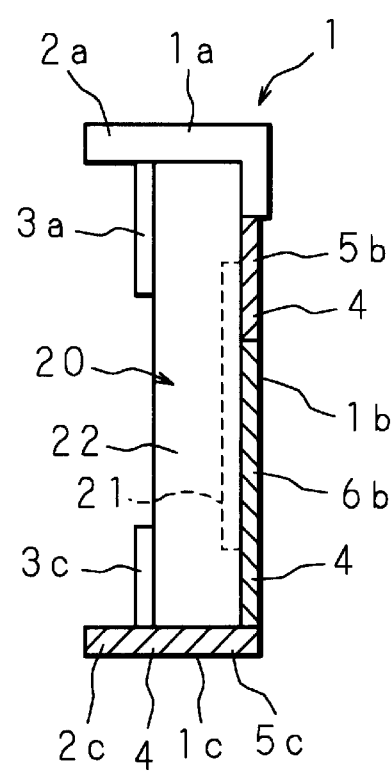

FIGS. 6(a) and 6(b) are front views showing the process of externally mounting an optical position detecting device 1 of the second embodiment on the display apparatus 20, and FIGS. 7(a) and 7(b) are side views showing the process of externally mounting the optical position detecting device 1. This optical position detecting device 1 is in the shape of a hollow rectangular parallelepiped body as a whole.

The upper side frame 1a comprises a guide part 5a with a rail (not shown) extended in the left and right direction, and a slide part 6a movable in the left and right direction along the rail. The guide part 5a and the slide part 6a incorporate optical units 10a and 10b having the structure shown in FIG. 2 at both ends, respectively.

The lower side frame 1c facing the side frame 1a comprises a guide part 5c with a rail (not shown) extended in the left and right direction, and a slide part 6c movable in the left and right direction along the rail. Moreover, the mutually facing left and right side frames 1b and 1d comprise guide parts 5b and 5d with rails extended in the up and down direction, and slide parts 6b and 6d movable in the up and down direction along the rails.

These lower, left and right side frames 1c, 1b and 1d are provided with a light retro-reflector 4. Tapered overlapped portions 7c, 7b and 7d having the light retro-reflector 4 are provided at the respective boundaries between the guide parts 5c, 5b, 5d and slide parts 6c, 6b, 6d of these side frames 1c, 1b and 1d so as to prevent the light retro-reflector 4 from having an uneven portion. The formation of such overlapped portions 7c, 7b and 7d makes it possible to certainly prevent creation of a non-sensitive region due to an uneven portion of the light retro-reflector 4.

Furthermore, the upper and lower side frames 1a and 1c comprise guide parts 2a, 2c and slide parts 3a, 3c similar to those in the first embodiment.

In a state where the slide parts 6a, 6b, 6c, 6d and the guide parts 5a, 5b, 5c, 5d are arranged to have a minimum overlapped portion and the slide parts 3a and 3c are set in the rear most positions, the upper left edge of the optical position detecting device 1 is fitted with the upper left edge of the screen frame 22 of the display apparatus 20, and then the upper and left side frames 1a and 1b of the optical position detecting device 1 are fitted with the upper- and left-side external edges of the screen frame 22 of the display apparatus 20, respectively (FIG. 6(a) and FIG. 7(a)). Next, the slide parts 6a and 6c are moved toward the left side until the right side frame 1d touches the right-side external edge of the screen frame 22 of the display apparatus 20, and the slide parts 6b and 6d are moved toward the upper side until the lower side frame 1c touches the lower-side external edge of the screen frame 22 of the display apparatus 20, and then the slide parts 3a and 3c on the rear side are moved toward the front side until they touch the rear face of the display apparatus 20 so as to externally fix the optical position detecting device 1 to the display apparatus 20 (FIG. 6(b) and FIG. 7(b)).

As described above, in the second embodiment, since the optical position detecting device 1 can be fixed in any position and can correspond to a variety of display apparatuses 20 having different sizes, namely lengths, widths and thicknesses, it is possible to mount the optical position detecting device 1 on various sizes of display apparatus 20.

(Third Embodiment)

Figure 5:
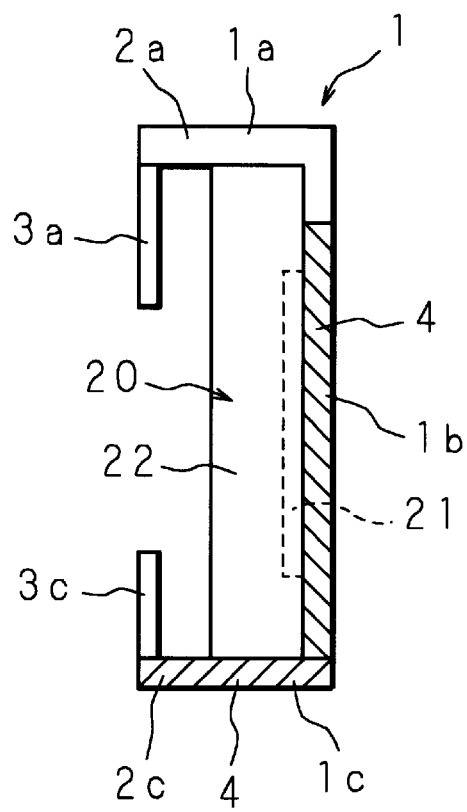
FIGS. 5(a) and 5(b) are side views showing the process of externally mounting the optical position detecting device of the first embodiment on the display apparatus.
Figure 5:
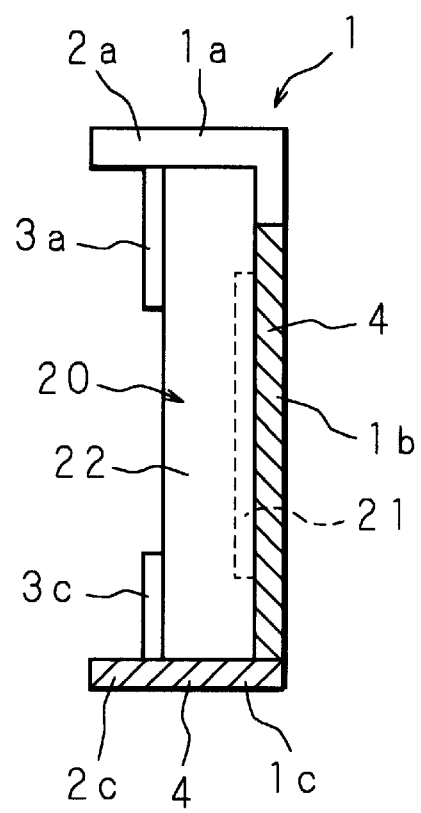
Figure 8:
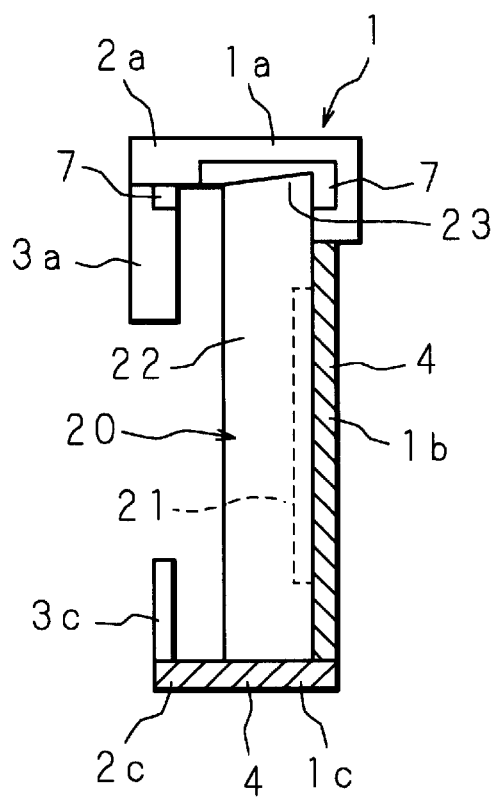
FIGS. 8(a) and 8(b) are side views showing the process of externally mounting an optical position detecting device of the third embodiment of the present invention on the display apparatus.
Figure 8:
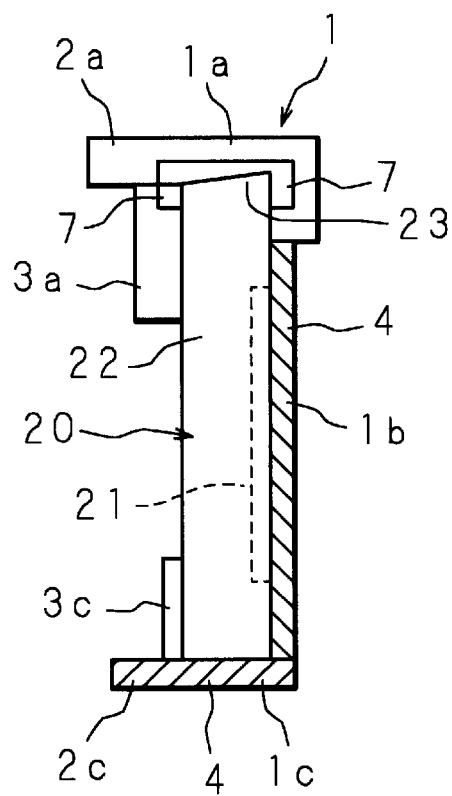

FIGS. 8(a) and 8(b) are side views showing the process of externally mounting an optical position detecting device 1 of the third embodiment on the display apparatus 20. In FIGS. 8(a) and 8(b), the same parts as those shown in FIG. 5 are designated with the same numbers, and the explanation thereof is omitted.

In this optical position detecting device 1, an elastic body 7 is attached to a face of the upper side frame 1a and the slide part 3a to be attached to the display apparatus 20. Therefore, even when a tapered part 23 is provided on the upper-side external edge of the screen frame 22 of the display apparatus 20, the adhesion between the optical position detecting device 1 and the display apparatus 20 is high, and the optical position detecting device 1 can be externally fixed to the display apparatus 20 in a certain manner.

Note that, while the above embodiment illustrates an example in which the elastic body 7 is attached only to the upper side frame 1a, it is of course possible to provide similar elastic bodies 7 on other side frames 1b, 1c and 1d.

(Fourth Embodiment)

Figure 9:
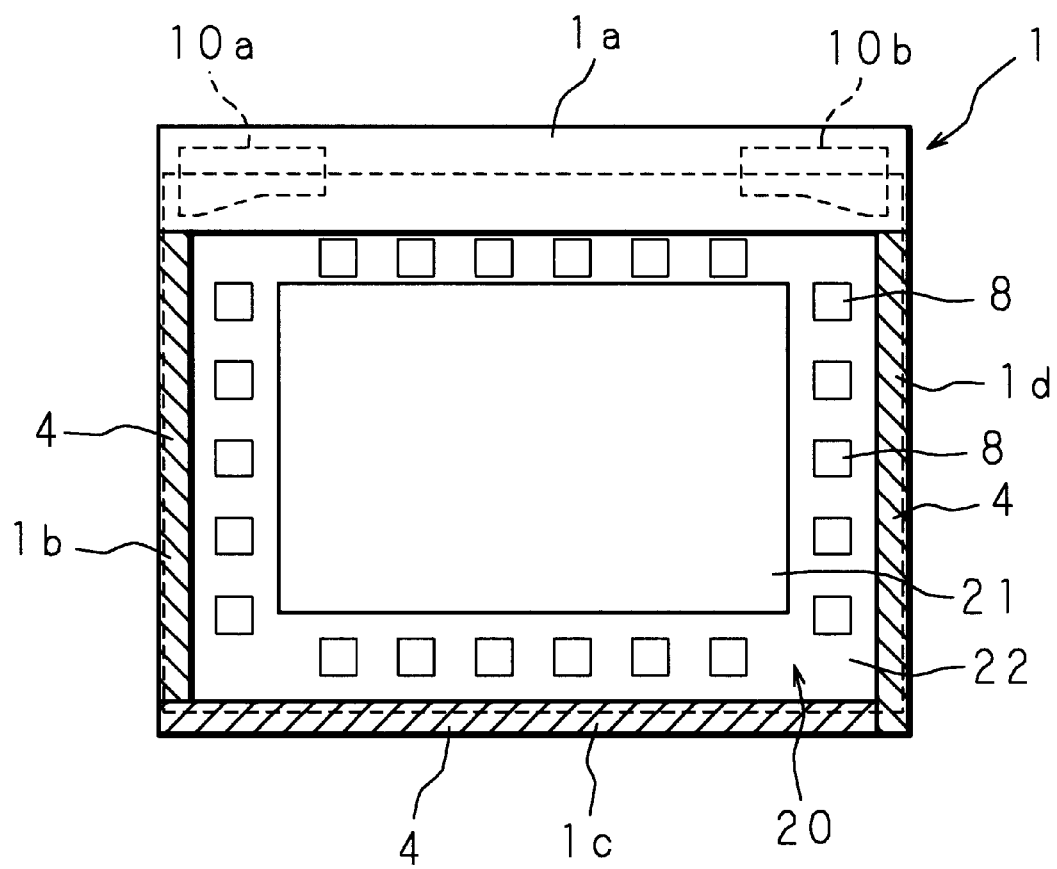
FIG. 9 is a front view showing a state where an optical position detecting device of the fourth embodiment of the present invention is externally mounted on the display apparatus.

FIG. 9 is a front view showing a state where an optical position detecting device 1 of the fourth embodiment is externally mounted on the display apparatus 20. In FIG. 9, the same parts as those shown in FIG. 4 are designated with the same numbers, and the explanation thereof is omitted. As shown in FIG. 9, in the front face of the display apparatus 20, a plurality of imaginary button areas 8 are set between the display screen 21 and the optical position detecting device 1, i.e., on the screen frame 22.

According to the present invention, by externally mounting the optical position detecting device 1 on the display apparatus 20, even if an indicated position is in a region other than the display screen 21, namely in the region of the screen frame 22, the indicated position can be detected. As a result, it becomes possible to effectively use the region other than the display screen 21 and enlarge the position detection range.

(Fifth Embodiment)

Figure 10:
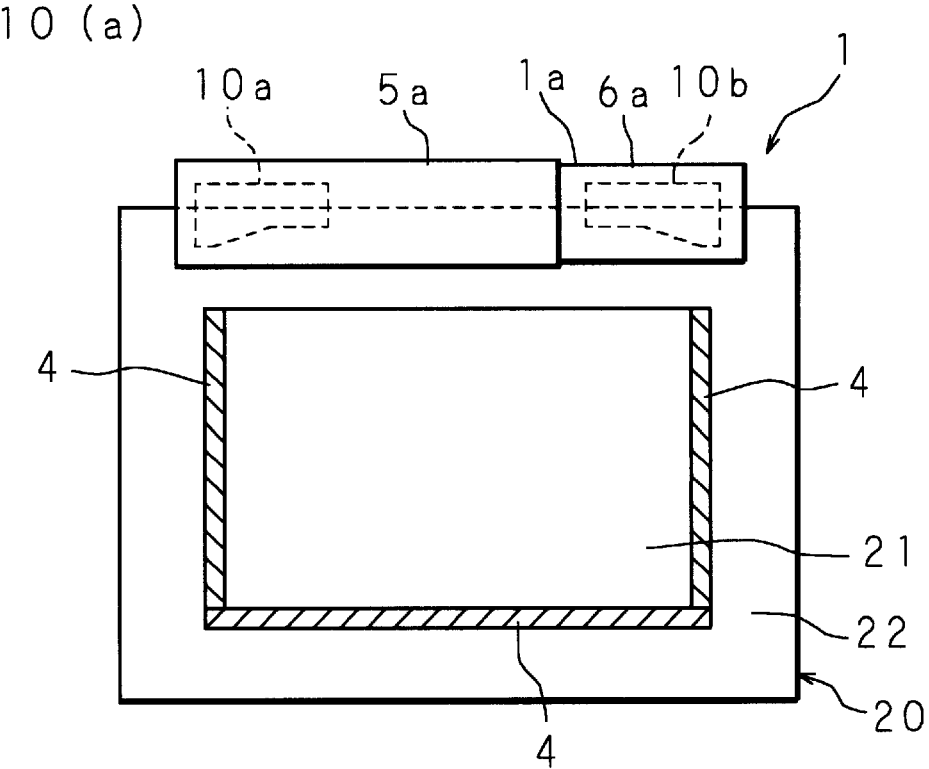
FIGS. 10(a) and 10(b) are front and side views showing a state where an optical position detecting device of the fifth embodiment of the present invention is externally mounted on the display apparatus.
Figure 10:
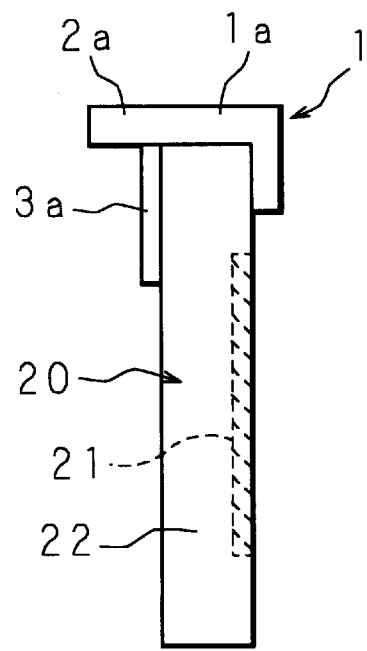

FIGS. 10(a) and 10(b) are front and side views showing a state where an optical position detecting device 1 of the fifth embodiment is externally mounted on the display apparatus 20. In FIGS. 10(a) and 10(b), the same parts as those shown in FIGS. 6 and 7 are designated with the same numbers, and the explanation thereof is omitted.

In the fifth embodiment, the light retro-reflector 4 is directly mounted on a portion with a difference in level, provided on the left, lower and right sides of the display screen 21 of the display apparatus 20. Moreover, only the side frame 1a, which is similar to that of the second embodiment, incorporates therein the optical units 10a and 10b and has the guide part 5a and slide part 6a, is externally mounted on the upper-side external edge of the display apparatus 20.

In the fifth embodiment, there is no need to provide the left-, lower- and right-side guide parts and slide parts having the light retro-reflector 4, thereby enabling a reduction in the size of the structure. Furthermore, since the scanning light comes closer to the display screen 21, it is possible to improve the operability.

Figure 11:
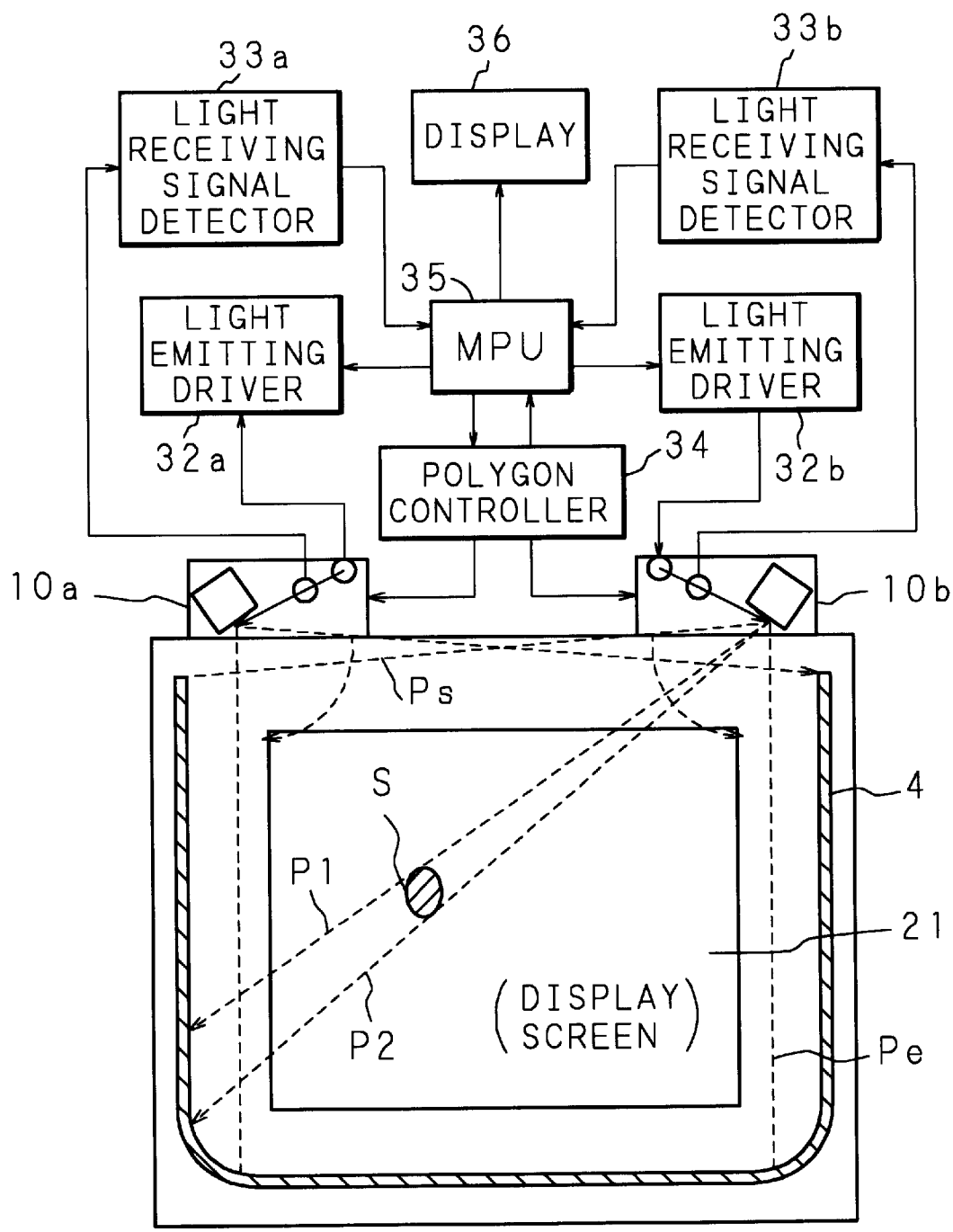
FIG. 11 is a view showing how the position detection process is operated.

Next, the following description will explain the operation of position detection which is operated by externally mounting the optical position detecting device 1 of the present invention having the above-described structure on the display apparatus 20. FIG. 11 is a view showing the position detection processing condition, including the circuit structure connected to the optical units 10a and 10b.

The optical units 10a and 10b are connected with light emitting element drivers 32a and 32b for driving the respective light emitting elements 11, light receiving signal detectors 33a and 33b for converting the quantity of light received by the respective light receiving elements 13 into electric signals, and a polygon controller 34 for controlling the operation of the respective polygon mirrors 15. Moreover, reference numeral 35 represents an MPU for calculating the position and size of an indicator S such as a finger and a pen and for controlling the entire operation of the device, and 36 represents a display for displaying the results of calculations performed by the MPU 35.

The MPU 35 transmits drive control signals to the light emitting element drivers 32a and 32b, so that the light emitting element drivers 32a and 32b are driven according to the drive control signals, and the light emitting operations of the respective light emitting elements 11 are controlled. The light receiving signal detectors 33a and 33b transmit the light receiving signals of the reflected light of the respective light receiving elements 13 to the MPU 35. The MPU 35 calculates the position and size of the indicator S based on the light receiving signals from the respective light receiving elements 13, and displays the results of the calculations on the display 36.

If the explanation is given with respect to the optical unit 10b, for example, as shown in FIG. 11, the projected light from the optical unit 10b is scanned in a counterclockwise direction in FIG. 11 from a position where the projected light directly enters the light receiving element 13 to a position (Ps) where the projected light is reflected by an end of the light retro-reflector 4, that is, a scanning start position. Then, the projected light is reflected by the light retro-reflector 4 until it comes to a position (P1) where the projected light reaches one end of the indicator S, but the projected light is cut off by the indicator S up to a position (P2) where it reaches the other end of the indicator S, and then the projected light is reflected by the light retro-reflector 4 until it comes to a scanning end position (Pe).

Figure 12:
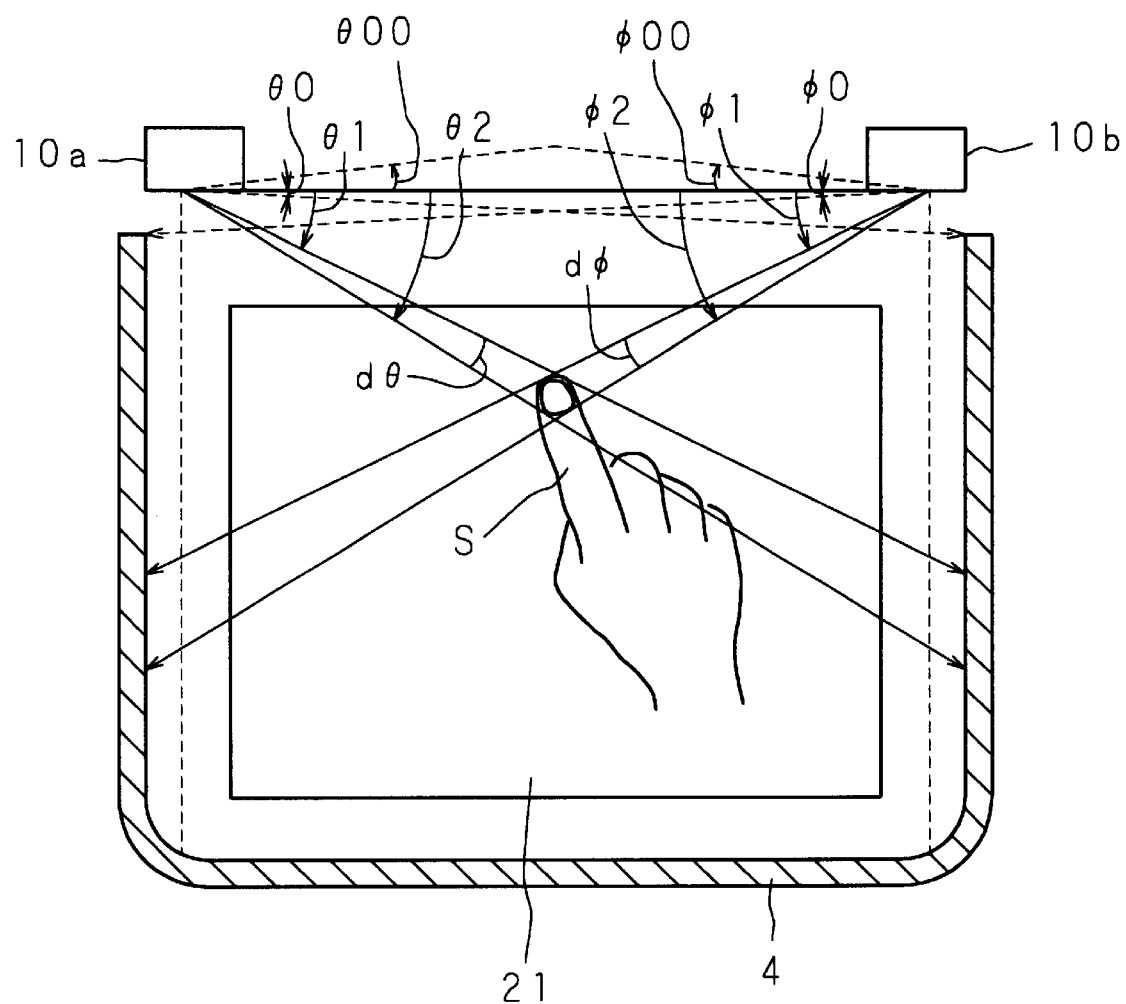
FIG. 12 is a schematic diagram showing the principle of calculating the position and size of an indicator.

Next, the following description will explain concrete operations for calculating the position and size of the indicator S. FIG. 12 is a schematic diagram showing the calculation principle. In FIG. 12, however, illustration of the constituent members other than the optical units 10a, 10b, light retro-reflector 4 and display screen 21 is omitted. Incidentally, FIG. 12 shows an example in which a finger is used as the indicator S.

The MPU 35 controls the polygon controller 34 to rotate the respective polygon mirrors 15 in the optical units 10a and 10b, thereby angularly scanning the laser light from the respective light emitting elements 11. As a result, the reflected light from the light retro-reflector 4 enters the respective light receiving elements 13. The quantity of the received light that entered the respective light receiving elements 13 as mentioned above is obtained as the light receiving signals which are the outputs of light receiving signal detectors 33a and 33b.

Further, in FIG. 12, $\theta 00$ and $\phi 00$ represent the angles from a reference line that connects the two optical units 10a and 10b together to the light receiving elements, respectively; $\theta 0$ and $\phi 0$ represent the angles from the reference line connecting the two optical units 10a and 10b together to the ends of the light retro-reflector 4; $\theta 1$ and $\phi 1$ represent the angles from the reference line to one end of the indicator S on the reference line side; and $\theta 2$ and $\phi 2$ represent the angles from the reference line to the other end of the indicator S on the opposite side to the reference line.

When the indicator S is present on the optical path of the scanning light on the display screen 21, the light projected from the optical units 10a and 10b and then reflected by the indicator S does not enter the respective light receiving elements 13. Therefore, in a condition as shown in FIG. 12, the reflected light does not enter the light receiving element 13 in the optical unit 10a when the scanning angle is in a range between 0° and $\theta 0$; the reflected light enters that light receiving element 13 when the scanning angle is in a range between $\theta 0$ and $\theta 1$; and the reflected light does not enter that light receiving element 13 when the scanning angle is in a range between $\theta 1$ and $\theta 2$. Similarly, the reflected light does not enter the light receiving element 13 in the optical unit 10b when the scanning angle is in a range between 0° and $\phi 0$; the reflected light enters that light receiving element 13 when the scanning angle is in a range between $\phi 0$ and $\phi 1$, and the reflected light does not enter that light receiving element 13 when the scanning angle is in a range between $\phi 1$ and $\phi 2$.

Figure 13:
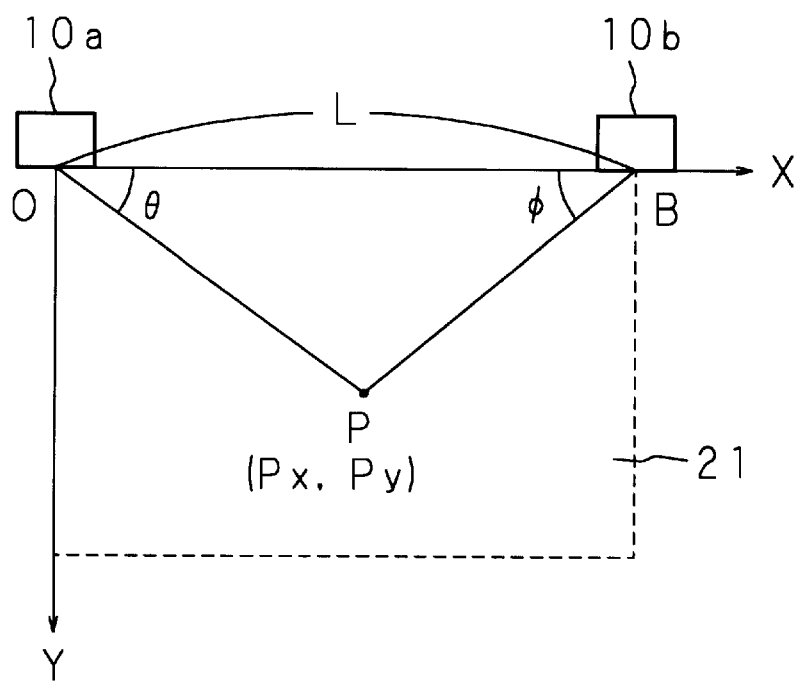
FIG. 13 is a schematic diagram showing the triangulation principle for detecting coordinates.

Next, the following description will explain a process of calculating coordinates of a central position (indicated position) of the indicator S (a finger in this example) from the cut-off range calculated in the above-mentioned manner. First, conversion of angles into orthogonal coordinates based on the triangulation will be explained. As shown in FIG. 13, the position of the optical unit 10a is set as an origin O, the upper side and left side of the display screen 21 are set as the X-axis and Y-axis, and the length of the reference line (the distance between the optical units 10a and 10b) is set as L. Moreover, the position of the optical unit 10b is set as B. When a central point P (Px, Py) indicated by the indicator S on the display screen 21 is positioned at angles of $\theta$ and $\phi$ with respect to the X-axis from the optical units 10a and 10b, the values of X coordinate Px and Y coordinate Py of the point P can be calculated according to the principle of triangulation as shown by the following equations (1) and (2), respectively.

$$Px(\theta, \phi) = (\tan\phi) \div (\tan\theta + \tan\phi) \times L \quad (1)$$

$$Py(\theta, \phi) = (\tan\theta \cdot \tan\phi) \div (\tan\theta + \tan\phi) \times L \quad (2)$$

Figure 14:
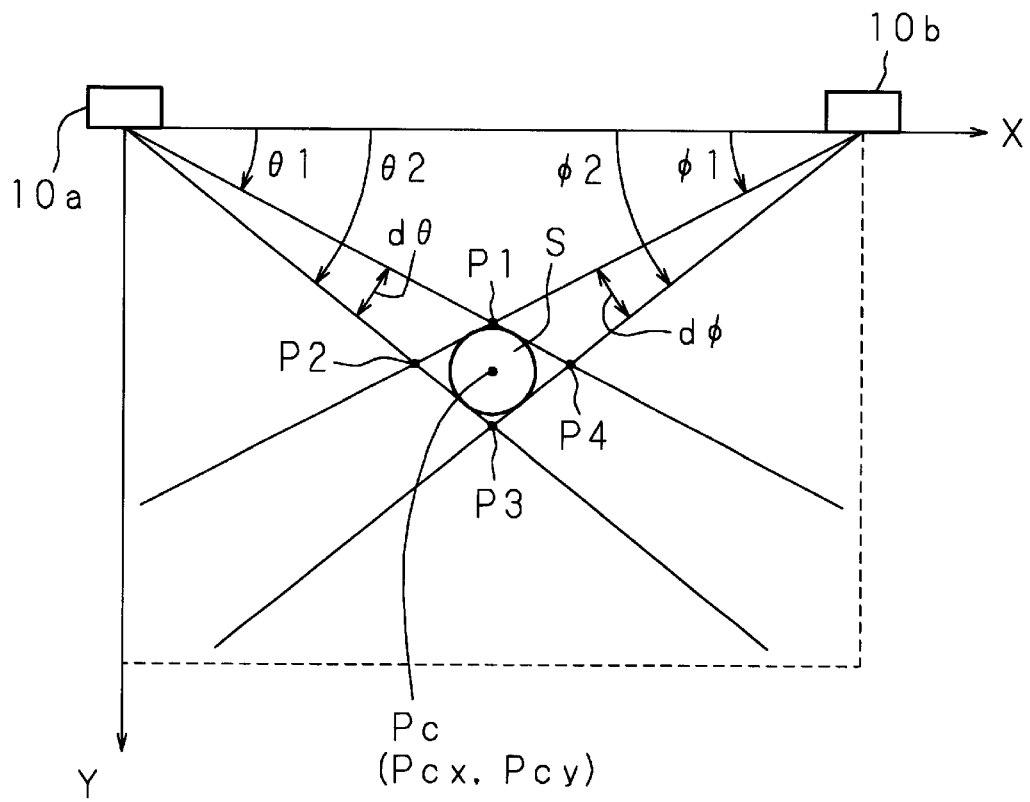
FIG. 14 is a schematic diagram showing an indicator and the cutoff range.

By the way, since the indicator S (finger) has dimensions, when the detection angle at the timing of rise/fall of the detected light receiving signal is employed, as shown in FIG. 14, four points (P1 through P4 in FIG. 14) on the edge of the indicator S (finger) are detected. These four points are all different from the indicated central point (Pc in FIG. 14). Thus, the coordinates (Pcx, Pcy) of the central point Pc are calculated as follows. Pcx and Pcy can be expressed as shown by the following equations (3) and (4), respectively.

$$Pcx(\theta, \phi) = Pcx(\theta 1 + d\theta/2, \phi 1 + d\phi/2) \quad (3)$$

$$Pcy(\theta, \phi) = Pcy(\theta 1 + d\theta/2, \phi 1 + d\phi/2) \quad (4)$$

Then, by substituting $\theta 1 + d\theta/2$ and $\phi 1 + d\phi/2$ expressed by equations (3) and (4) for $\theta$ and $\phi$ of equations (1) and (2) above, the coordinates of the indicated central point Pc can be obtained.

In the above-mentioned example, the average value of the angle is first calculated and then substituted into the converting equations (1) and (2) of triangulation so as to calculate the coordinates of the central point Pc as the indicated position. However, it is also possible to calculate the coordinates of the central point Pc by first calculating the orthogonal coordinates of the four points P1 through P4 from the scanning angles according to the converting equations (1) and (2) of triangulation and then calculating the average of the calculated coordinate values of the four points. Moreover, it is also possible to determine the coordinates of the central point Pc as the indicated position by considering parallax and easy viewing of the indicated position.

Figure 15:
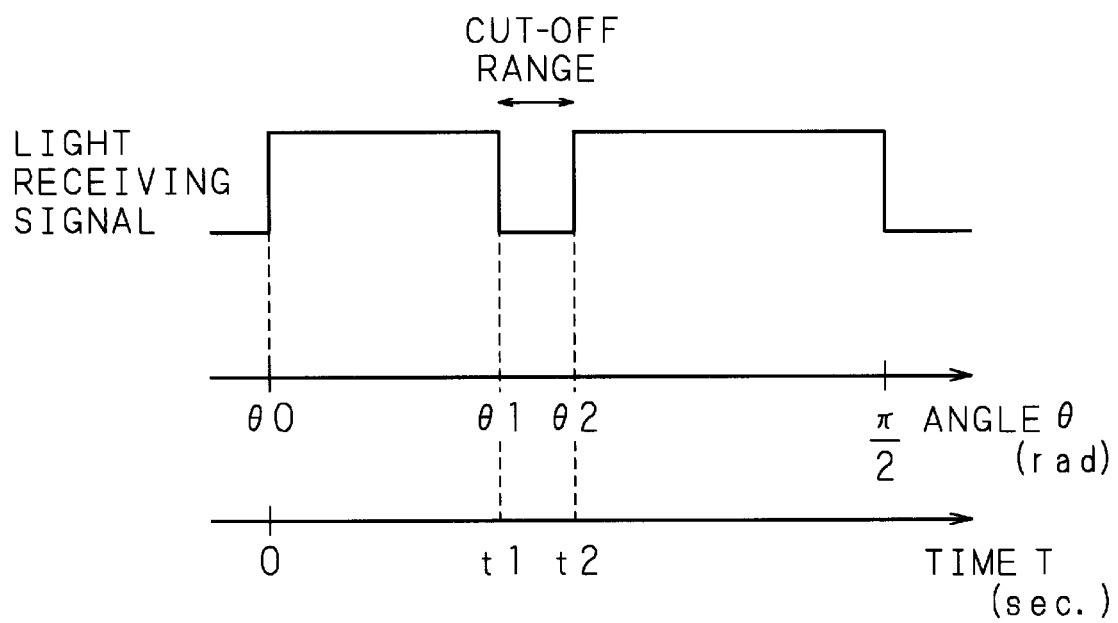
FIG. 15 is a timing chart showing the relation among the light receiving signal, the scanning angle and the scanning time.

By the way, when the scanning angular velocity of each polygon mirror 15 is constant, the information about the scanning angle is obtainable by measuring a time. FIG. 15 is a timing chart showing the relation between the light receiving signal from the light receiving signal detector 33a and the scanning angle θ and scanning time T of the polygon mirror 15 in the optical unit 10a. When the scanning angular velocity of the polygon mirror 15 is constant, if the scanning angular velocity is denoted as ω, then a proportional relation as shown by equation (5) below is established between the scanning angle θ and the scanning time T.

$$\theta = \omega \times T \quad (5)$$

Therefore, the angles θ1 and θ2 at the time of fall and rise of the light receiving signal establish the relations shown by equations (6) and (7) below with the scanning time t1 and t2.

$$\theta 1 = \omega \times t1 \quad (6)$$

$$\theta 2 = \omega \times t2 \quad (7)$$

Thus, when the scanning angular velocity of the polygon mirrors 15 is constant, it is possible to measure the cut-off range and coordinate position of the indicator S (finger) by using the time information.

Figure 16:
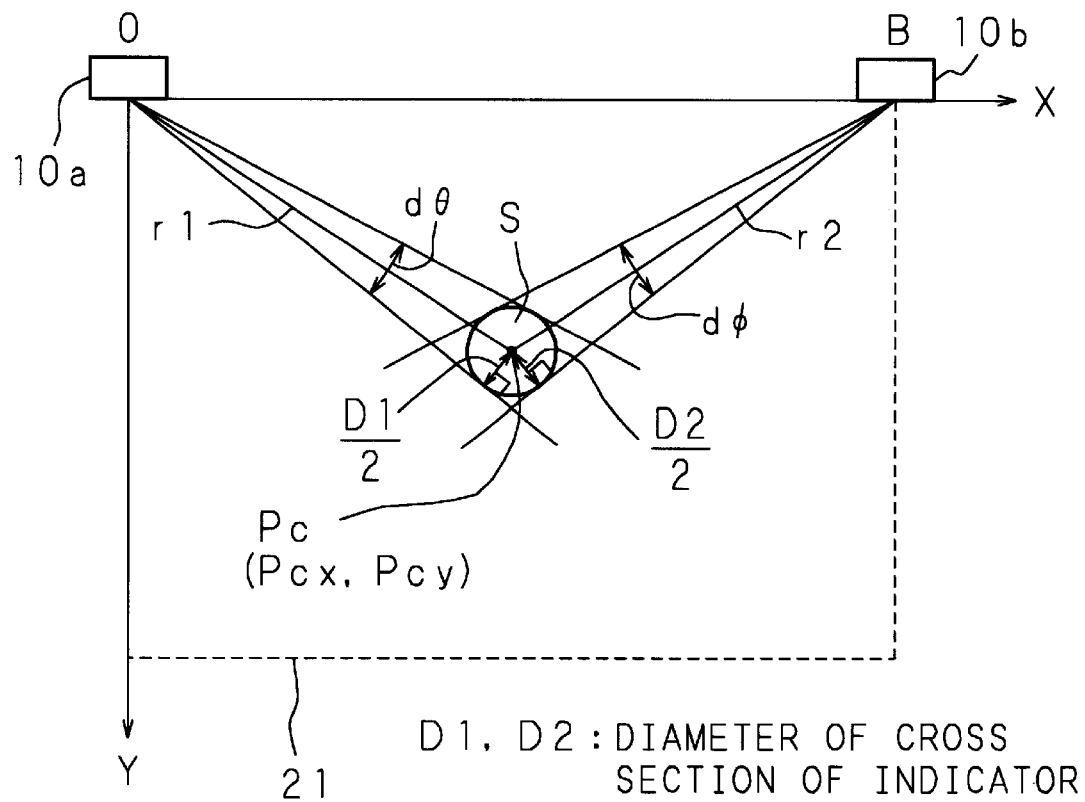
FIG. 16 is a schematic diagram showing the principle of measurement of a diameter of a cross section of the indicator.

In addition, it is also possible to calculate the size (the diameter of a cross section) of the indicator S (finger) from the measured cut-off range. FIG. 16 is a schematic diagram showing the principle of measuring the diameter of the cross section of the indicator S. In FIG. 16, D1 and D2 represent diameters of the cross sections of the indicator S seen from the optical units 10a and 10b, respectively. First, distances OPc (r1) and BPc (r2) from the positions O (0, 0) and B (L, 0) of the optical units 10a and 10b to the central point Pc (Pcx, Pcy) of the indicator S are calculated as shown by equations (8) and (9) below.

$$OPc = r1 = (Pcx^2 + Pcy^2)^{1/2} \quad (8)$$

$$BPc = r2 = \{(L-Pcx)^2 + Pcy^2\}^{1/2} \quad (9)$$

Since the radius of the cross section of the indicator S can be approximated by the product of the distance to the central point and sine of a half of the cut-off angle, the diameters D1 and D2 of the cross sections are measurable according to equations (10) and (11) below.

$$D1 = 2 \cdot r1 \cdot \sin(d\theta/2) = 2(Pcx^2 + Pcy^2)^{1/2} \cdot \sin(d\theta/2) \quad (10)$$

$$D2 = 2 \cdot r2 \cdot \sin(d\phi/2) = 2\{(L-Pcx)^2 + Pcy^2\}^{1/2} \cdot \sin(d\phi/2) \quad (11)$$

Further, when dθ/2, dφ/2≈0, it is possible to approximate sin(dθ/2)≈dθ/2≈tan(dθ/2) and sin(dφ/2)≈dφ/2≈tan(dφ/2), and therefore dθ/2 or tan(dθ/2), or dφ/2 or tan(dφ/2) may be substituted for sin(dθ/2) and sin(dφ/2) in equations (10) and (11).

Industrial Applicability

As described above, the optical position detecting device of the present invention can be externally mounted on an existing display apparatus in an easy manner. Moreover, the optical position detecting device can correspond to a variety of display apparatuses having different screen sizes because its size can be set in an arbitrary size. Furthermore, since there is no need to fabricate the optical position detecting device according to each screen size, it is possible to yield excellent productivity.

What is claimed is:

1. An optical position detecting device for optically detecting a position in a predetermined region indicated by an indicator, said optical position detecting device comprising:

a light retro-reflector;

at least two optical transceivers, each including an optical scanning unit for angularly scanning light in a plane substantially parallel to the predetermined region and a light receiving unit for receiving reflected light from a portion of said light retro-reflector irradiated with the scanning light; and a mounting member for mounting said light retro-reflector and said optical transceivers on an apparatus having the predetermined region so that said retro-reflector and said optical transceivers are positioned outside of the predetermined region;

wherein said mounting member comprises a position adjusting member for adjusting mounting positions of said light retro-reflector and said optical transceivers, said position adjusting member comprises a slide part that moves in one direction, and a guide part is provided that guides the movement of said slide part, an overlapped portion of said light retro-reflector being present at a boundary between said slide part and said guide part.

2. An optical position detecting device for optically detecting a position in a predetermined region indicated by an indicator, said optical position detecting device comprising:

a light retro-reflector;

at least two optical transceivers, each including an optical scanning unit for angularly scanning light in a plane substantially parallel to the predetermined region and a light receiving unit for receiving reflected light from a portion of said light retro-reflector irradiated with the scanning light; and a mounting member for mounting said light retro-reflector and said optical transceivers on an apparatus having the predetermined region so that said retro-reflector and said optical transceivers are positioned outside of the predetermined region;

wherein an elastic body is provided on a face of said mounting member to be attached to said apparatus, so as to obtain adhesion between said mounting member and said apparatus.

3. An optical position detecting device for optically detecting a position in a predetermined region indicated by an indicator, said optical position detecting device comprising:

a light retro-reflector;

at least two optical transceivers, each including an optical scanning unit for angularly scanning light in a plane substantially parallel to the predetermined region and a light receiving unit for receiving reflected light from a portion of said light retro-reflector irradiated with the scanning light; and a mounting member for mounting said light retro-reflector and said optical transceivers on an apparatus having the predetermined region so that said retro-reflector and said optical transceivers are positioned outside of the predetermined region;

wherein said mounting member comprises a position adjusting member for adjusting mounting positions of said light retro-reflector and said optical transceivers, and an elastic body is provided on a face of said mounting member to be attached to said apparatus, so as to obtain adhesion between said mounting member and said apparatus.

4. An optical position detecting device for optically detecting a position in a predetermined region indicated by an indicator, said optical position detecting device comprising:

a light retro-reflector;

at least two optical transceivers, each including an optical scanning unit for angularly scanning light in a plane substantially parallel to the predetermined region and a light receiving unit for receiving reflected light from a portion of said light retro-reflector irradiated with the scanning light; and a mounting member for mounting said light retro-reflector and said optical transceivers on an apparatus having the predetermined region so that said retro-reflector and said optical transceivers are positioned outside of the predetermined region;

wherein said mounting member comprises a position adjusting member for adjusting mounting positions of said light retro-reflector and said optical transceivers, said position adjusting member comprises a slide part that moves in one direction, a guide part is provided that guides the movement of said slide part, and an elastic body is provided on a face of said mounting member to be attached to said apparatus, so as to obtain adhesion between said mounting member and said apparatus.

5. An optical position detecting device for optically detecting a position in a predetermined region indicated by an indicator, said optical position detecting device comprising:

a light retro-reflector;

at least two optical transceivers, each including an optical scanning unit for angularly scanning light in a plane substantially parallel to the predetermined region and a light receiving unit for receiving reflected light from a portion of said light retro-reflector irradiated with the scanning light;

a mounting member for mounting said light retro-reflector and said optical transceivers on an apparatus having the predetermined region so that said retro-reflector and said optical transceivers are positioned outside of the predetermined region; and wherein said mounting member comprises a position adjusting member for adjusting mounting positions of said light retro-reflector and said optical transceivers, said position adjusting member comprises a slide part that moves in one direction, a guide part is provided that guides the movement of said slide part, an overlapped portion of said light retro-reflector being present at a boundary between said slide part and said guide part, and an elastic body is provided on a face of said mounting member to be attached to said apparatus, so as to obtain adhesion between said mounting member and said apparatus.

\* \* \* \* \*